United States Patent
Solazzo et al.

(10) Patent No.: US 11,312,429 B2
(45) Date of Patent: Apr. 26, 2022

(54) MOTOR VEHICLE HAVING SYNCHRONOUSLY OPERABLE ACTUATORS

(71) Applicant: Röchling Automotive SE & Co. KG, Mannheim (DE)

(72) Inventors: Domenico Solazzo, Worms (DE); Peter Dill, Ingolstadt (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 408 days.

(21) Appl. No.: 16/526,576

(22) Filed: Jul. 30, 2019

(65) Prior Publication Data
US 2020/0047827 A1 Feb. 13, 2020

(30) Foreign Application Priority Data
Aug. 7, 2018 (DE) ...................... 10 2018 213 251.8

(51) Int. Cl.
*B62D 35/00* (2006.01)
*B62D 37/04* (2006.01)
(Continued)

(52) U.S. Cl.
CPC ............. *B62D 37/04* (2013.01); *B62D 27/04* (2013.01); *B62D 35/005* (2013.01); *B62D 37/02* (2013.01)

(58) Field of Classification Search
CPC ...... Y02T 10/82; B62D 37/02; B62D 35/005; B62D 27/04; B62D 37/04
See application file for complete search history.

(56) References Cited

U.S. PATENT DOCUMENTS

2016/0229467 A1* 8/2016 Miller ................. B62D 35/005
2017/0158259 A1* 6/2017 Fahland ................ B62D 37/02
(Continued)

FOREIGN PATENT DOCUMENTS

DE 102020002844 A1 * 12/2020 ............ B62D 37/02
WO WO-2007047022 A2 * 4/2007 ........... B62D 35/005

OTHER PUBLICATIONS

German Search Report for corresponding DE 10 2018 213 251.8 dated Apr. 3, 2019, 9 pgs.

*Primary Examiner* — Paul N Dickson
*Assistant Examiner* — Maxwell L Meshaka
(74) *Attorney, Agent, or Firm* — Rankin, Hill & Clark LLP

(57) ABSTRACT

A motor vehicle having a first portion and a second portion movable relative thereto; the vehicle further includes an actuator arrangement by which the second portion is drivable relative to the first portion; and the vehicle having a control apparatus that is coupled to the actuator arrangement and controls the operation of the actuator arrangement; the actuator arrangement including at least two separate actuators arranged remotely from one another, which are each switchable between an operating state wherein an output member of the actuator outputs a force and/or a motion, and a passive state in which the output member does not, the actuators are synchronously operable in a synchronous operating mode, wherein one actuator, constituting a master actuator, is coupled directly to the control apparatus, and the at least one further actuator is connected to the energy supply of the master actuator only such that the at least one further actuator is supplied with operating energy, and is in the operating state, only when the master actuator is switched by the control apparatus into the operating state.

9 Claims, 2 Drawing Sheets

(51) Int. Cl.
*B62D 27/04* (2006.01)
*B62D 37/02* (2006.01)

(56) References Cited

U.S. PATENT DOCUMENTS

| | | |
|---|---|---|
| 2017/0267294 A1 | 9/2017 | Klop et al. |
| 2018/0057078 A1* | 3/2018 | Wiech .................... B62D 37/02 |
| 2018/0297647 A1* | 10/2018 | Klop .................... B62D 35/005 |
| 2019/0092402 A1* | 3/2019 | Fahland ................ B60W 30/02 |
| 2019/0106163 A1* | 4/2019 | Fahland ............... B62D 35/005 |
| 2019/0111979 A1* | 4/2019 | Demetrio ............. B62D 35/005 |
| 2020/0047827 A1* | 2/2020 | Solazzo ................. B62D 37/02 |
| 2020/0094888 A1* | 3/2020 | Grebel .................... B62D 37/02 |
| 2020/0160625 A1* | 5/2020 | Dudar .................... G01M 17/00 |
| 2020/0189668 A1* | 6/2020 | Urbach ................ B62D 35/005 |
| 2021/0070380 A1* | 3/2021 | Zhang .................... B62D 37/02 |
| 2021/0147010 A1* | 5/2021 | Klop ...................... B62D 37/02 |

* cited by examiner

MOTOR VEHICLE HAVING SYNCHRONOUSLY OPERABLE ACTUATORS

The present invention relates to a motor vehicle having a first motor vehicle portion and a second motor vehicle portion movable relative thereto; the motor vehicle further comprising an actuator arrangement by which the second motor vehicle portion is drivable to move relative to the first motor vehicle portion; and the motor vehicle comprising a control apparatus that is coupled in signal- and/or energy-transferring fashion to the actuator arrangement and controls the operation of the actuator arrangement; the actuator arrangement comprising at least two separate actuators arranged physically remotely from one another, which are each switchable between an operating state in which an output member of the actuator outputs a force and/or a motion, and a passive state in which the output member of the actuator does not output a force and/or a motion.

BACKGROUND OF THE INVENTION

Some second motor vehicle portions, for example active front spoilers or active rear spoilers, take up so much space relative to the remainder of the vehicle, constituting a possible first motor vehicle portion, that their positional change relative to the first motor vehicle portion which is necessary in the context of operation can no longer be effected by a single actuator but instead requires an actuator arrangement having several actuators. Because of the size of some second motor vehicle portions—an active front spoiler can extend substantially over the entire width of the vehicle—undesired effects can occur upon displacement thereof relative to the first vehicle portion and can impede rapid and correct displacement. One such undesired effect that results from a wide spacing of guidance configurations simultaneously with a short guidance length in terms of the wide spacing, is the special form of the known stick-slip effect which is often referred to as the "drawer effect." A spacing between the guidance configurations which is substantially greater in magnitude than the guidance length that they produce is typical, for example, for front spoilers or wheel spoilers. Active spoilers of this kind extend over a significant part of the vehicle width. Their motion path, on the other hand, is often only a few centimeters within the range of the motor vehicle's ground clearance.

In order to avoid the aforesaid undesired effects, it is generally necessary to operate the actuators of the actuator arrangement, which are associated for that purpose with the second motor vehicle portion and which drive the second motor vehicle portion to perform a displacement motion relative to the first motor vehicle portion, synchronously. Ideally, this means that the output members of the actuators of the actuator arrangement simultaneously output a motion of the same speed and/or a force of the same magnitude. The term "force" refers here not only to translational force but also to a torque.

This synchronous operation is intended to be achieved with a minimal economic outlay.

SUMMARY OF THE INVENTION

An object of the present invention is therefore to refine the motor vehicle recited previously in such a way that a desired synchronous operating mode, with simultaneous operation of at least two actuators of the actuator arrangement, can be achieved with a minimum economic outlay.

The present invention achieves this object on the previously recited motor vehicle by the fact that the actuators are synchronously operable in a synchronous operating mode, such that in order to ensure the synchronous operating mode one actuator of the actuator arrangement, constituting a master actuator, is coupled directly to the control apparatus, and the at least one further actuator of the actuator arrangement is connected to the energy supply of the master actuator only in such a way that the at least one further actuator is supplied with operating energy, and is in the operating state, only when the master actuator is switched by the control apparatus into the operating state.

It is therefore sufficient for only the master actuator to be coupled for communication with other vehicle constituents via a vehicle-internal communication line, for example a data bus. The at least one further actuator does not require this type of communication intelligence internal to the component, since it is itself also directly conveyed, by way of the operating energy delivered to the master actuator, into the operating state for the duration of the operating state of the master actuator and with exactly the same operating energy. The at least one further actuator, preferably all further actuators, of the actuator arrangement is therefore, in the interest of an inexpensive design, not only not connected to a vehicle-internal communication line but also not embodied for connection to such a communication line. A very simple and therefore inexpensive embodiment of the actuator, with no communication intelligence and no communication infrastructure, can therefore be selected for the at least one further actuator.

For definition purposes, an energy supply line is not be understood as a communication line. "Communication lines" for purposes of the present Application transfer communication signals which transport an information content but have an energy content that is not sufficient for operation of an actuator in a motor vehicle. "Communication lines" are understood for purposes of the present Application as those lines which transfer only communication signals, i.e. data, but no operating energy.

Synchronization of the actuators of the actuator arrangement is then effected on the basis of energy supply, by the fact that an energy supply is merely passed through to the at least one further actuator of the actuator arrangement during an operating state of the master actuator.

In a particularly simple instance of a synchronous operating mode, it can be sufficient for the master actuator and the at least one further actuator merely to be simultaneously in the operating state and simultaneously in the passive state, with no requirement that motions and/or forces of the same magnitude be outputted by the participating actuators during the operating state. A synchronous operating mode in which not only the aforementioned simultaneity of the two states (operating state and passive state) exists, but forces of identical magnitude and/or motions of identical magnitude are also outputted by the output members of the respective actuators, is nevertheless preferred. In that context, forces of identical magnitude occur at different output members. Motions of identical magnitude, for example identical motion speeds, of the various output members also occur simultaneously. This can easily be achieved by the fact that the master actuator and at least one further actuator are of identical design such that an energy delivery or energy supply of identical magnitude to the actuators brings about outputs of identical magnitude at the respective output members of the actuators. Preferably, all actuators of the actuator arrangement are of identical design in this fashion.

In principle, the master actuator and the at least one further actuator can be wired in parallel in terms of their energy supply. Preferably, however, the master actuator and the at least one further actuator are connected to one another in series in terms of their energy supply. An energy supply line that is unbranched, and is thus considerably simpler in terms of installation outlay, is then sufficient for supplying energy to the actuators of the actuator arrangement. In the interest of a maximally simple energy supply to the actuator arrangement, preferably all actuators of the actuator arrangement are connected in series with one another in terms of their energy supply.

In principle, the actuators of the actuator arrangement can be driven to output force and/or motion using any form of energy; for example, the actuators can be supplied with hydraulic or pneumatic or electrical energy. Electrical energy in particular should be available on any type of motor vehicle. Pneumatic and hydraulic energy reservoirs, conversely, are encountered more often on commercial vehicles than on passenger cars. An electrical energy supply to the actuators is therefore preferred.

Preferably the control apparatus is physically integrated into the master actuator in order to save installation space on the motor vehicle. The master actuator therefore preferably differs from the further actuators of the actuator arrangement in that it is the only actuator of the actuator arrangement which possesses at least rudimentary capabilities for data processing. For example, the master actuator can comprise one or several integrated circuits that contribute to the aforesaid integrated control apparatus. The master actuator also preferably comprises a data memory at least readable by the control apparatus. Operating programs for operation of the master actuator by the physically integrated control apparatus can be stored in this data memory. The other actuators of the actuator arrangement can be so-called "dumb" actuators that, having no capability for data processing, perform only their actuator function, and that only while they are being supplied with energy.

In principle, the actuator arrangement can be used to displace any second motor vehicle portion relative to the first motor vehicle portion. As stated above, a preferred application of the aforesaid actuator arrangement consists in modifying an aerodynamic property of the motor vehicle, so that preferably the first motor vehicle portion is a vehicle body and the second motor vehicle portion is a component that is embodied to modify an aerodynamic property of the motor vehicle by displacement relative to the vehicle body. A component of this kind, which can also be constituted by several sub-components connected to one another, can be, for example, an active front spoiler or active wheel spoiler, an active rear spoiler, and the like.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
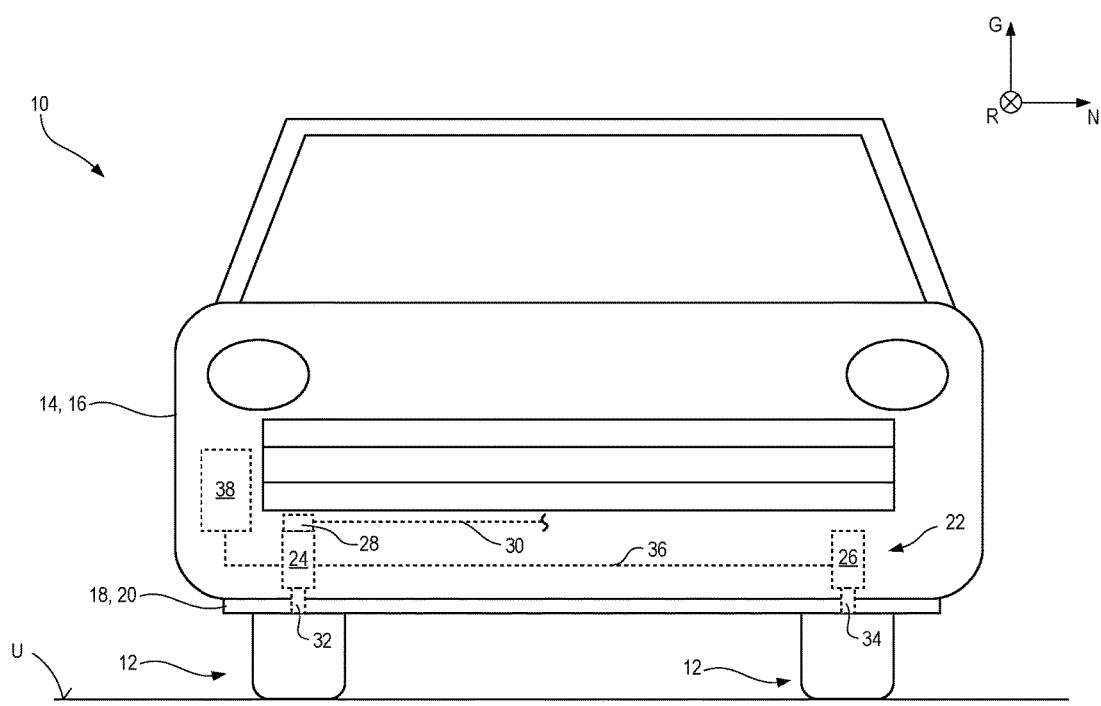
FIG. 1 is a schematic front view of a vehicle of the present invention according to the present application having a retracted active front spoiler constituting a second motor vehicle portion for purposes of the present Application.

Referring now to the drawings wherein the showings are for the purpose of illustrating preferred and alternative embodiments of the invention only and not for the purpose of limiting the same, in FIG. 1, an embodiment according to the present invention of a motor vehicle of the present Application is labeled in general with the number 10. Motor vehicle 10 is depicted merely schematically and is viewed from the front. Two front wheels 12 of motor vehicle 10 carry a vehicle body 14 above a substrate U on which motor vehicle 10 stands rollably. Vehicle body 14 constitutes a first motor vehicle portion 16 for purposes of the present Application.

Arranged in the front end region of motor vehicle 10, even in front of front wheels 12, is an active front spoiler 18 that for purposes of the present Application constitutes a second motor vehicle portion 20 displaceable relative to vehicle body 14. Active front spoiler 18 is movable parallel to yaw axis G of motor vehicle 10. For better orientation, the remaining axes of the Cartesian motor vehicle coordinate system (yaw axis G, pitch axis N, and roll axis R) are depicted in a coordinate triangle.

In order to bring about the relative motion of active front spoiler 18 relative to vehicle body 14, motor vehicle 10 comprises an actuator arrangement 22 having (in the example depicted) two actuators 24 and 26. Actuator 24 is a master actuator having communication infrastructure and having a control apparatus 28 physically integrated into master actuator 24. Actuator 26 is a "dumb" actuator that possesses exclusively an actuator functionality.

Control apparatus 28, having one or several integrated circuits, also handles communication tasks, and thus data communication between the "intelligent" master actuator 24 and the onboard electronics of the remainder of motor vehicle 10. Control apparatus 28, and therefore master actuator 24, are connected for that purpose, via a data lead 30 that is merely indicated, to the onboard electronics of the remainder of motor vehicle 10. Data lead 30 is preferably part of a data bus.

Actuators 24 and 26 each have a respective output member 32, 34, for example a piston rod or spindle or another drive device, which is connected, at its longitudinal end remote from the respective actuator housing, to front spoiler 18 for motion together. The actuator housings of actuators 24 and 26, conversely, are supported on vehicle body 14.

For energy supply, the two actuators 24 and 26, constituting electrical actuators, are connected, via a supply lead 36 that connects actuators 24 and 26 in series, to vehicle battery 38 constituting an electrical energy source.

Master actuator 24 is therefore connected in energy-transferring fashion to vehicle battery 38; control apparatus 28 of master actuator 24 permits or does not permit, as a function of data signals received by control apparatus 28 via data lead 30, energization of master actuator 24 and therefore switching thereof from an inactive passive state into a force- and motion-outputting operating state.

Further actuator 26, conversely, is connected to master actuator 24 exclusively by way of supply lead 36, so that further actuator 26 is always in the operating state when master actuator 24 is also in the operating state, and always in the passive state when master actuator 24 is also in the passive state. Synchronous operation of the two actuators 24 and 26 is thereby ensured with the simplest of means, even though only one of the two actuators, namely master actuator 24, is equipped with a signal- and data-processing infrastructure.

Figure 2:
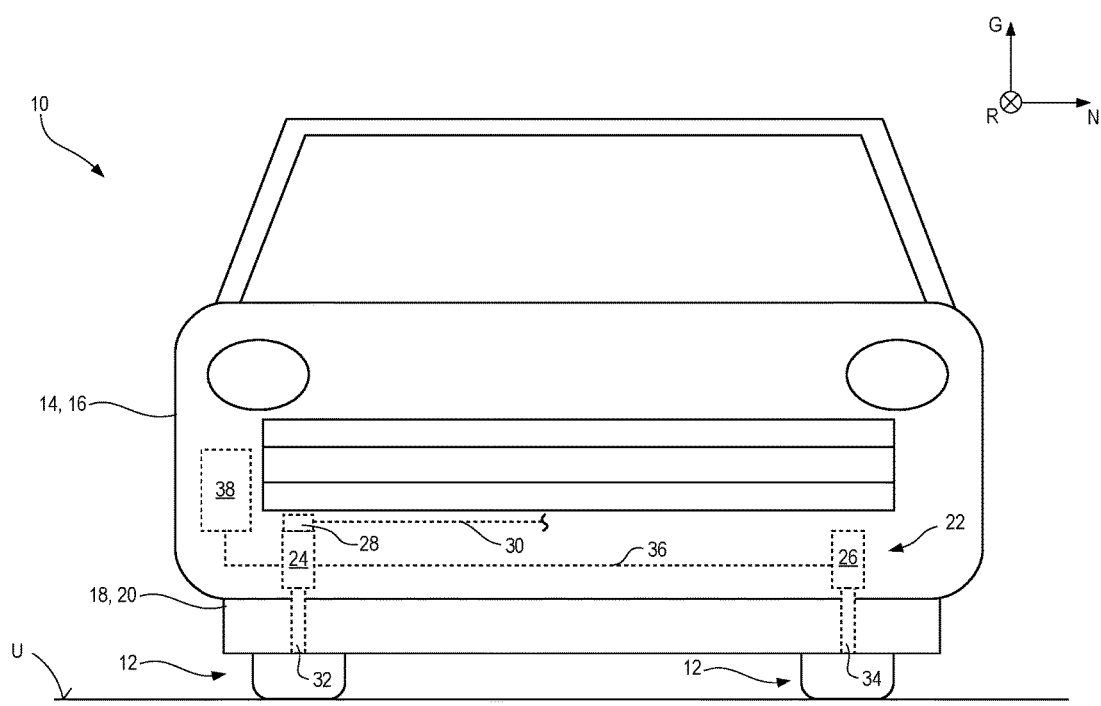
FIG. 2 is the view of FIG. 1 with the active front spoiler extended.

FIG. 2 shows motor vehicle 10 of FIG. 1 after front spoiler 18 has been displaced closer to substrate U, as happens, for example, when motor vehicle 10 is traveling continuously at a speed that is typical of driving outside built-up communities on main highways or expressways, for example at more than 75 km/h.

Front spoiler 18 has been displaced without difficulty, parallel to yaw axis G, by synchronous motion of output members 32 and 34. The synchronous motion of output members 32 and 34 is particularly important here because the displacement path of front spoiler 18 between its two end positions depicted in FIGS. 1 and 2 is short compared with the spacing of output members 32 and 34 from one another in a direction orthogonal to the displacement path. A disadvantageous ratio of this kind between the spacing of guidance means and/or displacement means on the one hand and the displacement path on the other hand often results, during displacement, in the so-called "drawer effect," whereby a continuous displacement motion is impeded by even slight tilting of the object that is to be displaced.

Synchronous motion of output members 32 and 34 is ensured exclusively by a synchronous energy supply, only one actuator (namely master actuator 24) having a functionality for controlling the energy supply.

Beyond merely switching on and off, control apparatus 28 of master actuator 24 can influence the magnitude of the energy supply to master actuator 24 over the duration of the operating state of master actuator 24, for example in such a way that the motion of output member 32 exhibits a startup ramp with a constant acceleration from a standstill, a motion phase at a constant high speed, and a deceleration ramp at a constant negative acceleration to a standstill. Because all further actuators—in this case, further actuator 26—are synchronized with master actuator 24 thanks to an energy supply shared therewith, the motion of output member 34, and if applicable of the output members of further actuators, exhibits the same motion behavior as output member 32 of master actuator 24.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A motor vehicle having a first motor vehicle portion and a second motor vehicle portion movable relative to the first motor vehicle portion; the motor vehicle further comprising an actuator arrangement by which the second motor vehicle portion is drivable to move relative to the first motor vehicle portion; and the motor vehicle comprising a control apparatus that is coupled in signal- and/or energy-transferring fashion to the actuator arrangement and controls the operation of the actuator arrangement; the actuator arrangement comprising at least two separate actuators arranged physically remotely from one another, each of the at least two separate actuators being switchable between an operating state in which an output member of said each actuator outputs a force and/or a motion, and a passive state in which the output member of said each actuator does not output a force and/or a motion, wherein the at least two separate actuators are synchronously operable in a synchronous operating mode, such that in order to ensure the synchronous operating mode one actuator of the at least two separate actuators of the actuator arrangement, constituting a master actuator, is coupled directly to the control apparatus, and at least one further actuator of the at least two separate actuators of the actuator arrangement is connected to an energy supply of the master actuator only in such a way that the at least one further actuator is supplied with operating energy, and is in the operating state, only when the master actuator is switched by the control apparatus into the operating state, wherein only the master actuator is coupled to an onboard vehicle communication network and the at least one further actuator of the actuator arrangement is not coupled to the onboard vehicle communication network.

2. The motor vehicle according to claim 1, wherein the master actuator and the at least one further actuator are of identical design such that an energy delivery of identical magnitude to the at least two separate actuators brings about outputs of identical magnitude at the respective output members of the at least two separate actuators.

3. The motor vehicle according to claim 1, wherein the master actuator and the at least one further actuator are connected to one another in series in terms of their energy supply.

4. The motor vehicle according to claim 1, wherein all actuators of the actuator arrangement are connected in series with one another in terms of their energy supply.

5. The motor vehicle according to claim 1, wherein the control apparatus is physically integrated into the master actuator.

6. The motor vehicle according to claim 1, wherein the first motor vehicle portion is a vehicle body; and the second motor vehicle portion is a component that is embodied to modify aerodynamic properties of the motor vehicle by displacement relative to the vehicle body.

7. The motor vehicle according to claim 1, wherein the master actuator is coupled to a data bus.

8. The motor vehicle according to claim 1, wherein all further actuators, of the actuator arrangement are not coupled to the onboard vehicle communication network.

9. A motor vehicle having a first motor vehicle portion and a second motor vehicle portion movable relative to the first motor vehicle portion; the motor vehicle further comprising an actuator arrangement by which the second motor vehicle portion is drivable to move relative to the first motor vehicle portion; and the motor vehicle comprising a control apparatus that is coupled in signal- and/or energy-transferring fashion to the actuator arrangement and controls the operation of the actuator arrangement; the actuator arrangement comprising at least two separate actuators arranged physically remotely from one another, each of the at least two separate actuators being switchable between an operating state in which an output member of said each actuator outputs a force and/or a motion, and a passive state in which the output member of said each actuator does not output a force and/or a motion, wherein the at least two separate actuators are synchronously operable in a synchronous operating mode and wherein the at least two separate actuators includes a master actuator and at least one further actuator, the master actuator being coupled directly to the control apparatus which is coupled to an onboard vehicle communication network, the master actuator having a power inlet operably connected to a vehicle power supply and the master actuator having a power outlet, the at least one further actuator being connected to the power outlet of the master actuator only in such a way that the at least one further actuator is supplied with operating energy from the vehicle power supply only from the power outlet of the master actuator, and is in the operating state, only when the master actuator is switched by the control apparatus into the operating state and the master actuator receives operating energy from the vehicle power supply.

* * * * *